US010483780B2

(12) United States Patent
Koyama

(10) Patent No.: US 10,483,780 B2
(45) Date of Patent: Nov. 19, 2019

(54) ELECTRONIC APPARATUS AND CONTROL METHOD FOR THE SAME

(71) Applicant: CANON KABUSHIKI KAISHA, Tokyo (JP)

(72) Inventor: Tadashi Koyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 155 days.

(21) Appl. No.: 15/837,125

(22) Filed: Dec. 11, 2017

(65) Prior Publication Data
US 2018/0175650 A1 Jun. 21, 2018

(30) Foreign Application Priority Data

Dec. 21, 2016 (JP) .................. 2016-248393

(51) Int. Cl.
H02J 7/00 (2006.01)
H02J 7/02 (2016.01)
H02J 50/20 (2016.01)
H04N 5/63 (2006.01)
H04N 5/232 (2006.01)

(52) U.S. Cl.
CPC ............ H02J 7/0068 (2013.01); H02J 7/025 (2013.01); H02J 50/20 (2016.02); H02J 2007/0095 (2013.01); H04N 5/23241 (2013.01); H04N 5/63 (2013.01)

(58) Field of Classification Search
CPC .......... H02J 7/0068; H02J 50/20; H02J 7/025; H02J 2007/0095; H04N 5/23241; H04N 5/63
See application file for complete search history.

(56) References Cited

U.S. PATENT DOCUMENTS

| 5,739,667 A | 4/1998 | Matsuda et al. |
| 6,715,071 B2 | 3/2004 | Ono et al. |
| 7,663,345 B2 | 2/2010 | Ozawa et al. |
| 2017/0141774 A1 | 5/2017 | Koyama |

FOREIGN PATENT DOCUMENTS

| JP | 08-182219 A | 7/1996 |
| JP | 2000-029544 A | 1/2000 |
| JP | 2007-252154 A | 9/2007 |
| JP | 4837408 B2 | 12/2011 |

Primary Examiner — Robert L Deberadinis
(74) Attorney, Agent, or Firm — Venable LLP

(57) ABSTRACT

An electronic apparatus comprises a chargeable battery and a control unit configured to control power supply to a power supply unit of the apparatus and charging of the battery using the power received from an external apparatus. If a power amount that can be received from the external apparatus is sufficient to operate the apparatus but not sufficient to charge the battery, the control unit controls the predetermined voltage so as to reduce power consumption during operation of the apparatus, and if the received power is greater than the power consumption during operation of the apparatus, the control unit charges the battery using the power received from the external apparatus.

12 Claims, 5 Drawing Sheets

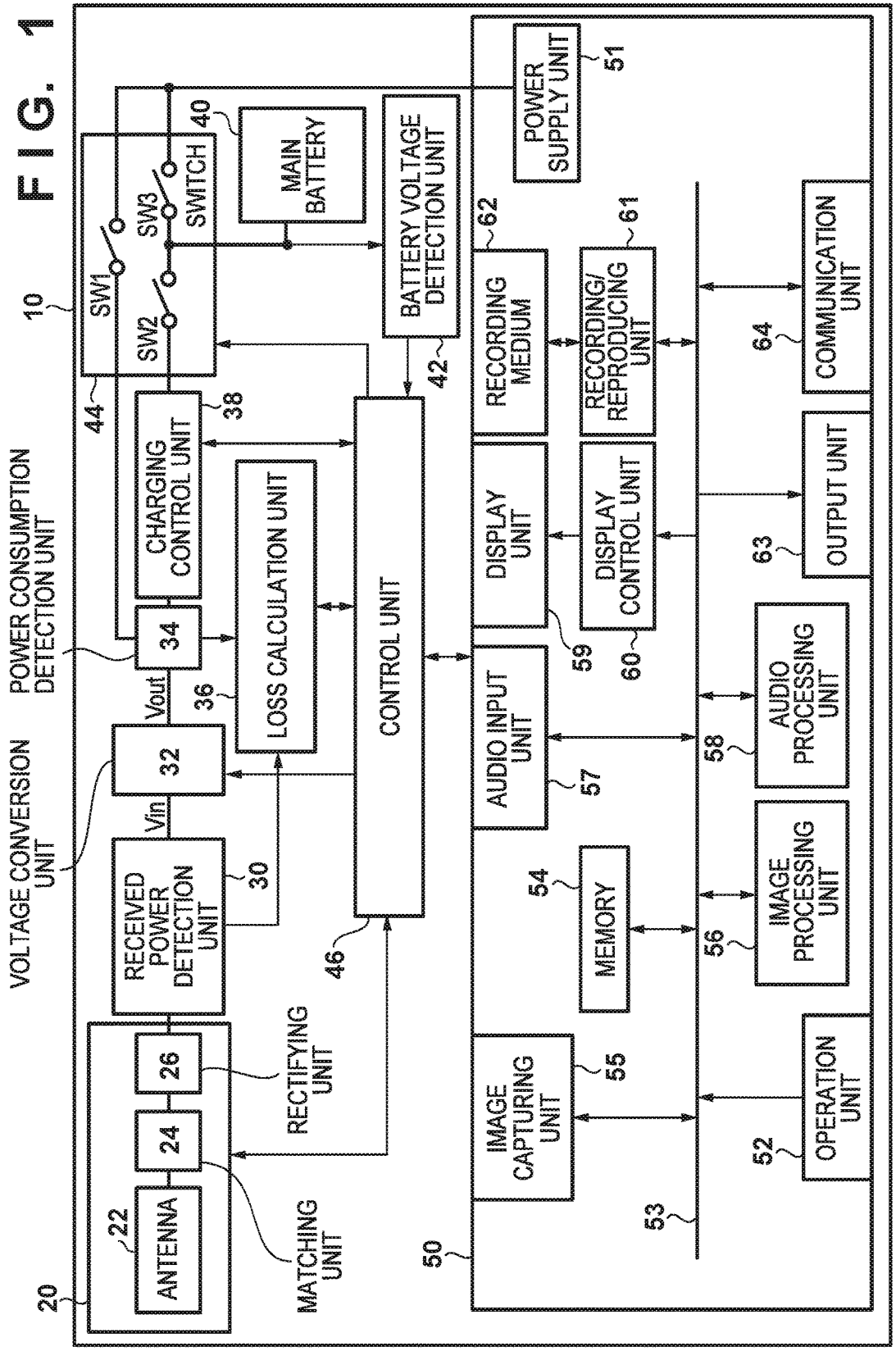

F I G. 3A
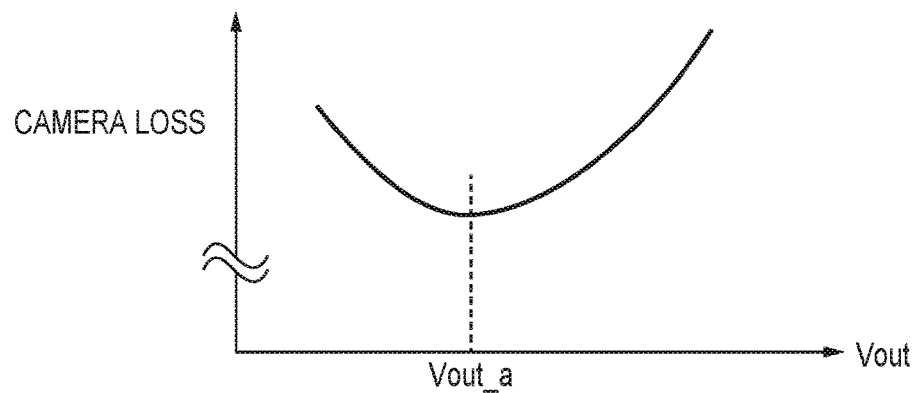
F I G. 3B
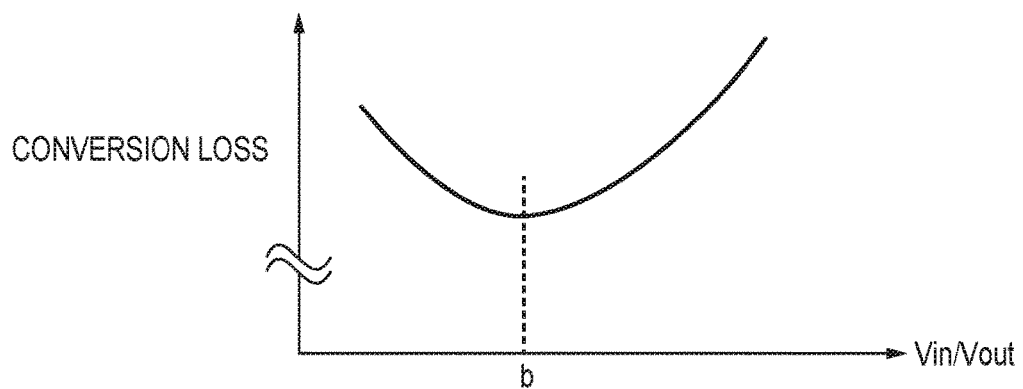
F I G. 3C
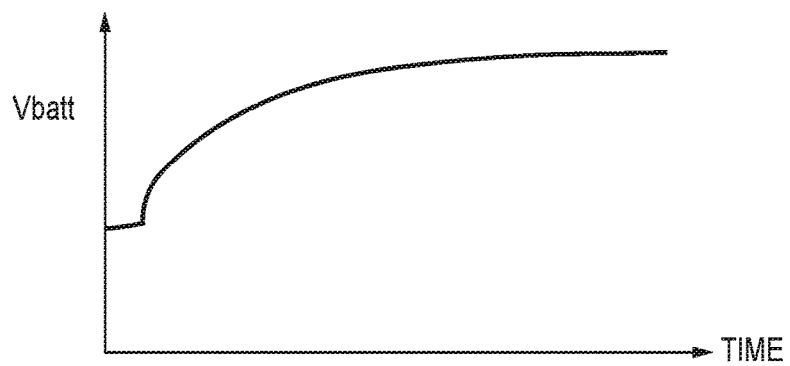

ELECTRONIC APPARATUS AND CONTROL METHOD FOR THE SAME

BACKGROUND OF THE INVENTION

Field of the Invention

The present invention relates to a non-contact power supply system.

Description of the Related Art

In recent years, non-contact power supply systems have been known in which power is supplied through an electromagnetic induction scheme, a magnetic resonance scheme, or the like, with non-contact and without connecting apparatuses with a wire. A non-contact power supply system is realized by a power transmitting apparatus and a power receiving apparatus exchanging various types of information, such as power to be transmitted/received. A method of using non-contact communication such as NFC, Bluetooth (registered trademark), which has a wider transmission range, or the like is used to exchange the information.

Although an increase in user-friendliness is expected with non-contact power supply, there are cases where the received power obtained from the power transmitting apparatus is limited or becomes unstable due to the positional relationship between the antennas of the power transmitting apparatus and the power receiving apparatus or due to the surrounding environment. For this reason, if the power receiving apparatus is caused to operate using the received power, the received power varies (decreases) even if it is intermittent, and if insufficient power supply occurs as a result of the received power falling below the power consumption of the apparatus, there is a risk that the apparatus will experience a system crash or the like. Even in the case where the received power supply is stable and small, this kind of insufficient power supply may occur if the power consumption varies (increases). In Japanese Patent No. 4837408, charging of a secondary battery and power supply from the secondary battery to a system are switched between according to the load driving current of the system, and control is performed such that a system crash does not occur even if the power consumption of the system varies.

However, in Japanese Patent No. 4837408 above, voltage conversion loss occurs since voltage conversion is performed during battery power supply, in which power is supplied from the battery to the load of the system. Also, although voltage conversion loss during battery power supply does not occur in Japanese Patent Laid-Open No. 8-182219 and Japanese Patent Laid-Open No. 2000-029544, the driving voltage of the load needs to always be set higher than the battery voltage. Also, in the case of charging the secondary battery, in general, if the voltage is not higher than the battery voltage, charging cannot be performed. On the other hand, power loss during load driving changes due to the consumed current and driving voltage of the load. In other words, the load driving voltage at which power loss is at its minimum during load driving and the charging voltage of the battery are not necessarily the same.

Accordingly, if power is supplied to the load without re-setting the charging voltage obtained by converting the input voltage corresponding to the received power from the power transmitting apparatus, the power conversion efficiency during load driving cannot be optimized. Also, if the received power from the power transmitting apparatus is limited, more power for charging the battery can be ensured the smaller the power loss during load driving is, but since the power conversion efficiency cannot be optimized if the load driving voltage depends on the battery voltage, it is not possible to reduce the power loss. In other words, since the power for charging the secondary battery cannot be ensured at the maximum limit, the charging time is extended.

SUMMARY OF THE INVENTION

The present invention has been made in consideration of the aforementioned problems, and realizes a technique according to which an electronic apparatus can be operated stably and charging time for a battery can be shortened even if a power amount that can be received through non-contact power supply is sufficient to operate the electronic apparatus but not sufficient to charge the battery.

In order to solve the aforementioned problems, the present invention provides an electronic apparatus comprising: a chargeable battery; a power receiving unit capable of receiving power from an external apparatus with non-contact; a charging control unit configured to charge the battery with power received from the external apparatus; a switching unit configured to switch to a state of supplying power to at least one of a power supply unit of an apparatus and the battery based on a predetermined voltage obtained using the power received from the external apparatus; and a control unit configured to control power supply to the power supply unit of the apparatus and charging of the battery using the power received from the external apparatus, wherein if a power amount that can be received from the external apparatus is sufficient to operate the apparatus but not sufficient to charge the battery, the control unit controls the predetermined voltage so as to reduce power consumption during operation of the apparatus, and if the received power is greater than the power consumption during operation of the apparatus, the control unit charges the battery using the power received from the external apparatus.

In order to solve the aforementioned problems, the present invention provides a control method of an electronic apparatus which has a chargeable battery, a power receiving unit capable of receiving power from an external apparatus with non-contact, a charging control unit configured to charge the battery with power received from the external apparatus, and a switching unit configured to switch to a state of supplying power to at least one of a power supply unit of an apparatus and the battery based on a predetermined voltage obtained using the power received from the external apparatus, the method comprising: controlling power supply to the power supply unit of the apparatus and charging of the battery using the power received from the external apparatus, wherein in the controlling, if a power amount that can be received from the external apparatus is sufficient to operate the apparatus but not sufficient to charge the battery, the control unit controls the predetermined voltage so as to reduce power consumption during operation of the apparatus, and if the received power is greater than the power consumption when operating the apparatus, the control unit charges the battery using the power received from the external apparatus.

In order to solve the aforementioned problems, the present invention provides a computer-readable storage medium storing a program for causing a computer to execute a control method of an electronic apparatus which has a chargeable battery, a power receiving unit capable of receiving power from an external apparatus with non-contact, a charging control unit configured to charge the battery with power received from the external apparatus, and a switching unit configured to switch to a state of supplying power to at least one of a power supply unit of an apparatus and the battery based on a predetermined voltage obtained using the power received from the external apparatus, the method comprising: controlling power supply to the power supply unit of the apparatus and charging of the battery using the power received from the external apparatus, wherein in the controlling, if a power amount that can be received from the external apparatus is sufficient to operate the apparatus but not sufficient to charge the battery, the control unit controls the predetermined voltage so as to reduce power consumption during operation of the apparatus, and if the received power is greater than the power consumption when operating the apparatus, the control unit charges the battery using the power received from the external apparatus.

According to the present invention, an electronic apparatus can be operated stably and charging time for a battery can be shortened even if a power amount that can be received through non-contact power supply is sufficient to operate the electronic apparatus but not sufficient to charge the battery.

Further features of the present invention will become apparent from the following description of exemplary embodiments (with reference to the attached drawings).

BRIEF DESCRIPTION OF THE DRAWINGS

FIG. 1 is a block diagram showing an exemplary configuration of an electronic apparatus according to the present embodiment.

FIG. 3A is a diagram illustrating a power loss characteristic of the electronic apparatus according to the present embodiment.

FIG. 3B is a diagram illustrating a voltage conversion loss characteristic of the electronic apparatus according to the present embodiment.

FIG. 3C is a diagram illustrating a charge voltage of the electronic apparatus according to the present embodiment.

DESCRIPTION OF THE EMBODIMENTS

Figure 2A:
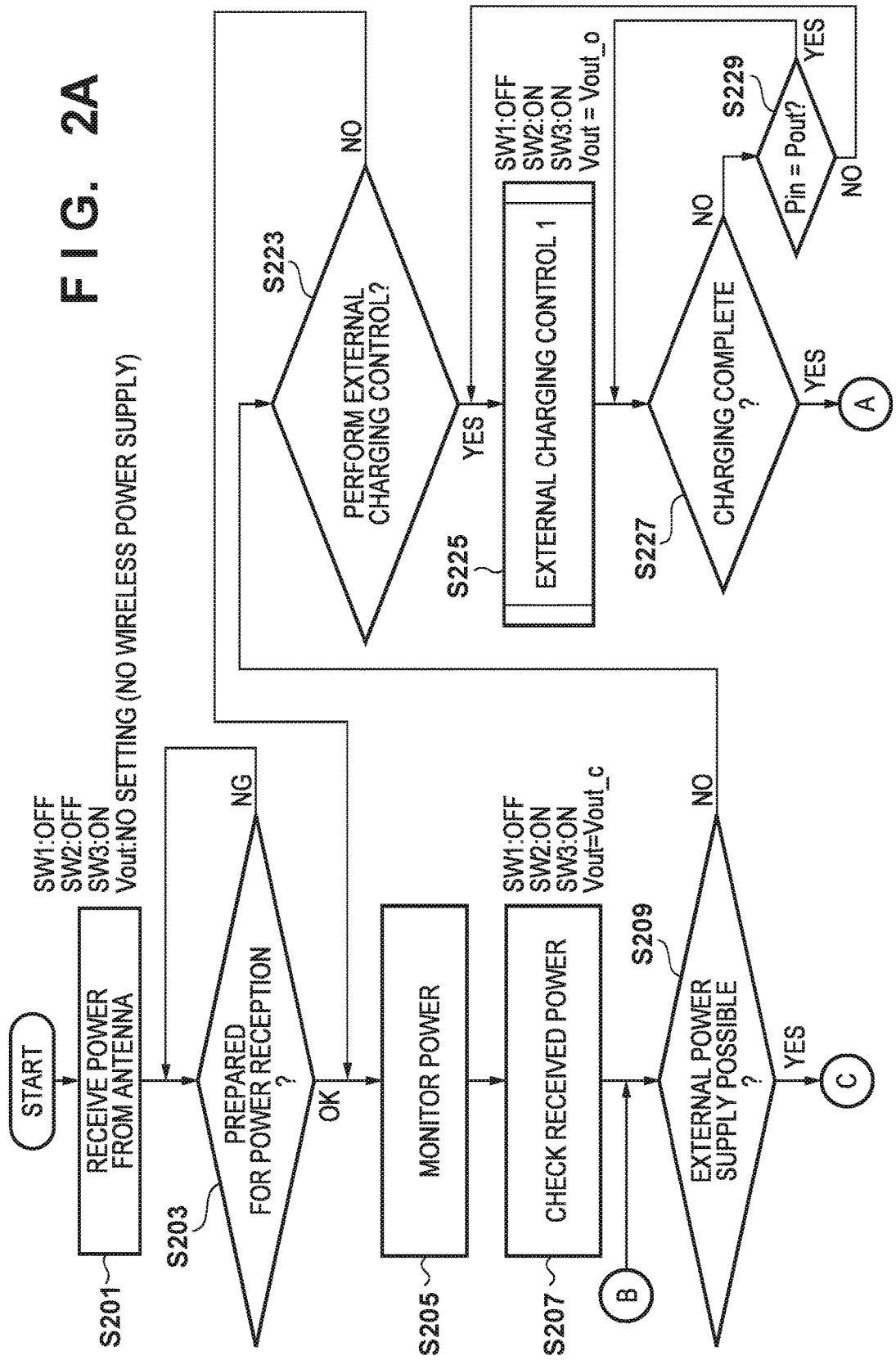
FIGS. 2A to 2C are flowcharts showing an exemplary operation of the electronic apparatus according to the present embodiment.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

With a non-contact power supply system of the present embodiment, a battery of an apparatus can be charged through wireless power supply without connecting apparatuses with a wire. With wireless power supply, power is transmitted and received due to an antenna of a power receiving apparatus receiving electromagnetic waves emitted from an antenna of a power transmitting apparatus. Also, with the non-contact power supply system, the power transmitting apparatus and the power receiving apparatus use wireless communication to transmit and receive various types of information such as power to be transmitted/received.

Apparatus Configuration

First, a configuration of an electronic apparatus according to the present embodiment will be described with reference to FIG. 1.

An electronic apparatus serving as a power receiving apparatus according to the present embodiment is an image capturing apparatus 10 such as a digital camera for example, and has a function of receiving power transmitted from an external power transmitting apparatus (not shown) serving as a power transmitting apparatus. Note that the electronic apparatus serving as the power receiving apparatus is not limited to being the image capturing apparatus 10, and as long as it is an electronic apparatus that operates through power supply from a secondary battery, it may be a tablet-type PC, a smartphone, or a reproducing apparatus that reproduces audio data or image data.

A power receiving unit 20 includes an antenna 22, a matching unit 24, and a rectifying unit 26, and is a power receiving circuit that receives wireless power supply from an external power transmitting apparatus.

The antenna 22 receives electromagnetic waves emitted from the external power transmitting apparatus and thus receives wireless power. For example, the antenna 22 is a loop antenna or the like that is formed in a pattern, and may also be used as an antenna for data transmission.

The matching unit 24 includes an impedance matching circuit and the like for connecting the received power from the antenna 22 to a downstream portion such that transfer loss does not occur.

The rectifying unit 26 includes a rectifying circuit or the like for rectifying and smoothing AC power from the matching unit 22.

A received power detection unit 30 is a detection circuit that detects power received by the power receiving unit 20. The method for detecting the received power may be a method of simply converting the received power from the received voltage.

A voltage conversion unit 32 receives power from the power receiving unit 20 and converts a rectified and smoothed input voltage Vin into a voltage for charging a main battery 40, which is a chargeable secondary battery, or a voltage for driving a later-described camera block 50.

A power consumption detection unit 34 detects power consumption during external power control in which the image capturing apparatus 10 is driven using received power from an external power transmitting apparatus, power consumption during external charging, in which a battery is charged using received power from the external power transmitting apparatus, and power consumption during battery power supply control, in which the image capturing apparatus 10 is driven using the power of the battery. Note that power consumption detection may be performed by a switch unit 44 located at a downstream portion.

A loss calculation unit 36 compares received power Pin detected by the received power detection unit 30 and power consumption Pout detected by the power consumption detection unit 34 and calculates a difference between the received power and the power consumption. In the calculation of the difference, the loss calculation unit 36 calculates the voltage conversion loss in the voltage conversion unit 32 in addition to the power consumption. The voltage conversion loss changes due to the consumed current during external power supply control and during external charging control, and the input voltage Vin and output voltage Vout in the voltage conversion unit 32, and the voltage conversion loss reaches its minimum when Vin/Vout shown in FIG. 3B is a predetermined value b.

A charging control unit 38 performs external charging control of a main battery 40 using the output voltage Vout of the voltage conversion unit 32. The charging control unit 38 switches control to one of trickle charging, constant current charging, and constant voltage charging according to the state of the main battery 40 and charges the main battery 40 with a predetermined charging current or charging voltage while controlling the output voltage Vout of the voltage conversion unit 32. During charging, as shown in FIG. 3C, the output voltage Vout of the voltage conversion unit 32 is controlled to be a first setting voltage Vout_c. The first setting voltage Vout_c is a value that changes according to the charging current, and the charging power changes according to the charging current and the output voltage Vout.

The battery voltage detection unit 42 detects a voltage Vbatt of the main battery 40. The switch unit 44 can be controlled by a control unit 46, and includes a first switch SW1 for external power supply that drives the image capturing apparatus 10 using the received power from the external power transmitting apparatus, a second switch SW2 for external charging that charges a battery using the received power from the external power transmitting apparatus, and a third switch SW3 for battery power supply that drives the image capturing apparatus 10 using the power of the battery.

The first switch SW1 disconnects (turns on and off) the current flow between the voltage conversion unit 32 and a power supply unit 51 of the camera block 50. The second switch SW2 disconnects (turns on and off) the current flow between the voltage conversion unit 32 and the main battery 40. The third switch SW3 disconnects (turns on and off) the current flow between the voltage conversion unit 32, the main battery 40, and the power supply unit 51 of the camera block 50. When the first switch SW1 is turned on, the power supply unit 51 of the camera block 50 is supplied with power using the output voltage Vout of the voltage conversion unit 32. When the second switch SW2 is turned on, the main battery 40 is supplied with power via the charging control unit 38 using the output voltage Vout of the voltage conversion unit 32. When the third switch SW3 is turned on, the power supply unit 51 of the camera block 50 is supplied with power using the output voltage Vbatt of the main battery 40.

Also, in the case of performing only external power supply, the first switch SW1 for external power supply is turned on, the second switch SW2 for external charging is turned off, and the third switch SW3 for battery power supply is turned off. Also, in the case of performing external power supply and external charging simultaneously, the first switch SW1 for external power supply is turned on, the second switch SW2 for external charging is turned on, and the third switch SW3 for battery power supply is turned off. Also, in the case of performing only external charging, the first switch SW1 for external power supply is turned off, the second switch SW2 for external charging is turned on, and the third switch SW3 for battery power supply is turned off. Furthermore, in the case of performing battery power supply, the first switch SW1 for external power supply is turned off, the second switch SW2 for external charging is turned off, and the third switch SW3 for battery power supply is turned on.

The control unit 46 includes a calculation processing circuit such as a CPU and a memory circuit such as a RAM, and controls the blocks of the image capturing apparatus 10 and data transmission between the blocks by executing various processes (programs) according to operation signals from an operation unit 52 that receives user operations. Also, the control unit 46 has a modulation/demodulation function of writing and reading data with non-contact with the external power transmitting apparatus, and a communication function for checking the state of communication with the external power transmitting apparatus and setting the transmitted power. Also, the control unit 46 monitors the voltage conversion unit 32, the power consumption detection unit 34, and the loss calculation unit 36 and controls the setting of the output voltage Vout of the voltage conversion unit 32, the charging current of the charging control unit 38, and the turning on/off of the switch unit 44.

The operation unit 52 is composed of switches, dials, a touch panel provided on the display unit 59, and the like, receives user operations, and transmits operation signals to the control unit 46. For example, the operation unit 52 has switches for inputting various operations relating to image capturing, such as a power supply button, a recording start button, a zoom adjustment button, and an auto-focus button. Also, the operation unit 52 includes a menu display button, a determination button, a cursor key, a pointing device, a touch panel, and the like, and when the user operates these keys and buttons, operation signals are transmitted to the control unit 46.

A bus 53 is a general-purpose bus for transmitting and receiving various data, control signals, instruction signals, and the like between the blocks of the image capturing apparatus 10.

An image capturing unit 55 converts an optical image of an object taken in by a lens into an image signal using an image sensor such as a CCD sensor or a CMOS sensor by controlling the amount of light using a diaphragm, performs analog-digital conversion, transmits the resulting signal to the memory 54, and temporarily stores it therein.

An image processing unit 56 executes processing needed for recording and reproducing of an image. The image processing unit 56 performs image quality adjustment processing for adjusting the white balance, color, brightness, and the like based on setting values set by the user or setting values determined based on characteristics of the image, on a digital image signal that was obtained by the image capturing unit 55 and stored in the memory 54. Also, the image processing unit 56 performs processing for generating moving image data based on the image signals of multiple frames resulting from the image quality adjustment processing. Also, the image processing unit 56 can execute processing for generating still image data based on an image signal resulting from the image quality adjustment processing.

The moving image data and still image data generated by the image processing unit 56 are stored in a region other than the region in which the image signal resulting from the digital conversion is stored in the memory 54.

For example, an audio input unit 57 collects (acquires) audio in the periphery of the image capturing apparatus 10 using a built-in nondirectional microphone or an external microphone or the like that is connected via an audio input terminal, converts an acquired analog audio signal into a digital signal, transmits the resulting digital signal to the memory 54, and temporarily stores it therein.

An audio processing unit 58 executes processing needed for recording and reproducing of audio, and performs processing such as level optimization processing and noise reduction processing on the digital audio signal that was acquired by the audio input unit 57 and stored in the memory 54. Also, the audio processing unit 58 performs processing for compressing the audio signal as needed. The audio data generated by the audio processing unit 58 is once again stored in the memory 54.

A display control unit 60 performs display control for displaying an image on the display unit 59. The display control unit 60 reads out the digital image signal stored temporarily in the memory 54 and displays it on the display unit 59.

Also, a recording/reproducing unit 61 records the still image data transferred from the control unit 46 in a recording medium 62 and records the moving image data and audio data in the recording medium 62 as one moving image file. Also, the recording/reproducing unit 61 reads out (reproduces) the still image file or moving image file recorded in the recording medium 62.

An output unit 63 is an audio terminal and an image terminal that outputs a moving image signal and an audio signal to an external apparatus.

A communication unit 64 transmits and receives data to and from the power transmitting apparatus and other external apparatuses, such as the external power transmitting apparatus (not shown). The communication unit 64 can perform short-range wireless communication with an external apparatus, and transmits and receives various types of information for performing wireless power supply with the external power transmitting apparatus. The communication scheme performed by the communication unit 64 is, for example, Bluetooth (registered trademark), which is a short-range wireless communication standard, but it is also possible to use near field wireless communication such as NFC (Near Field Communication).

Wireless Power Supply Operation

Figure 2B:
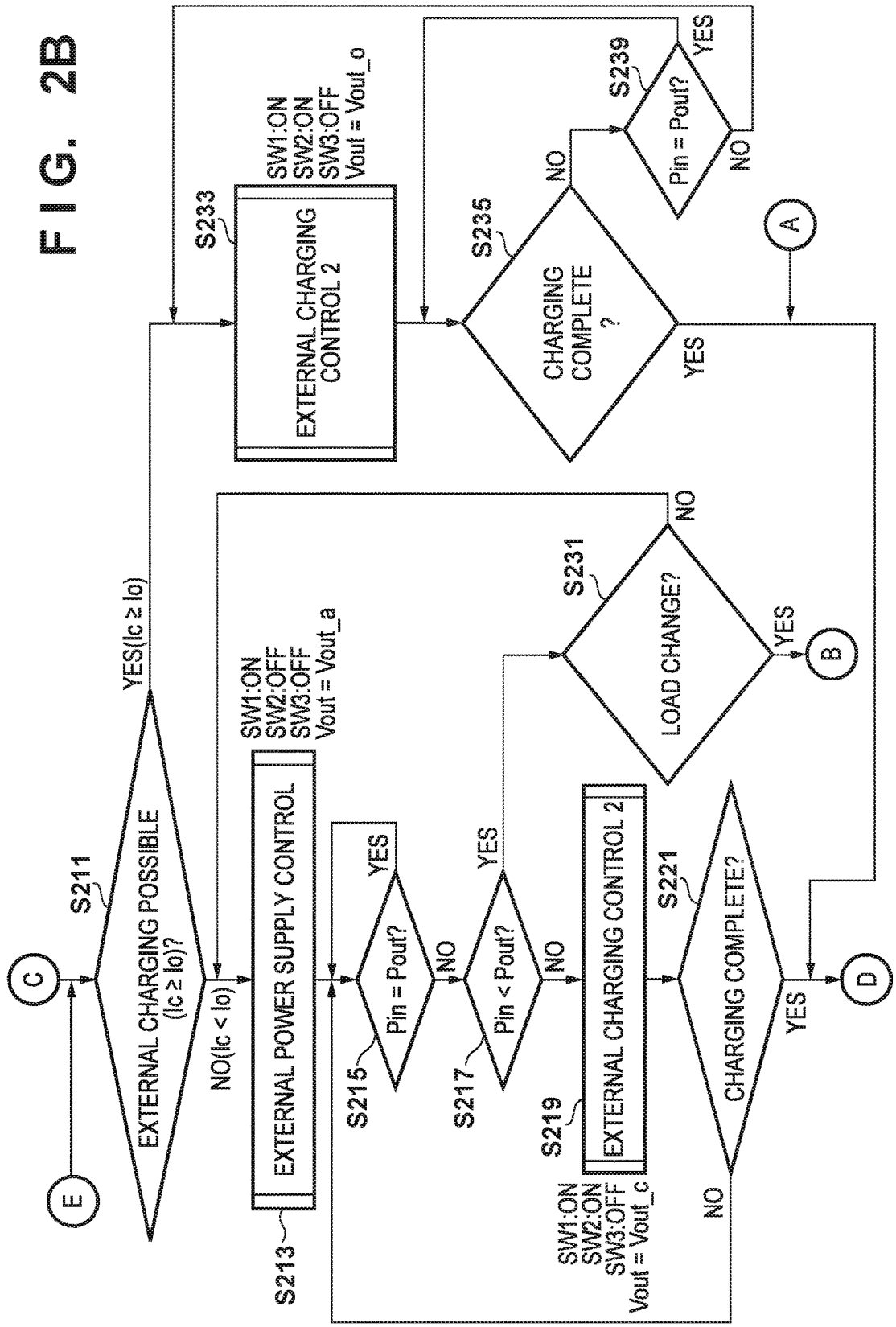
Figure 2C:
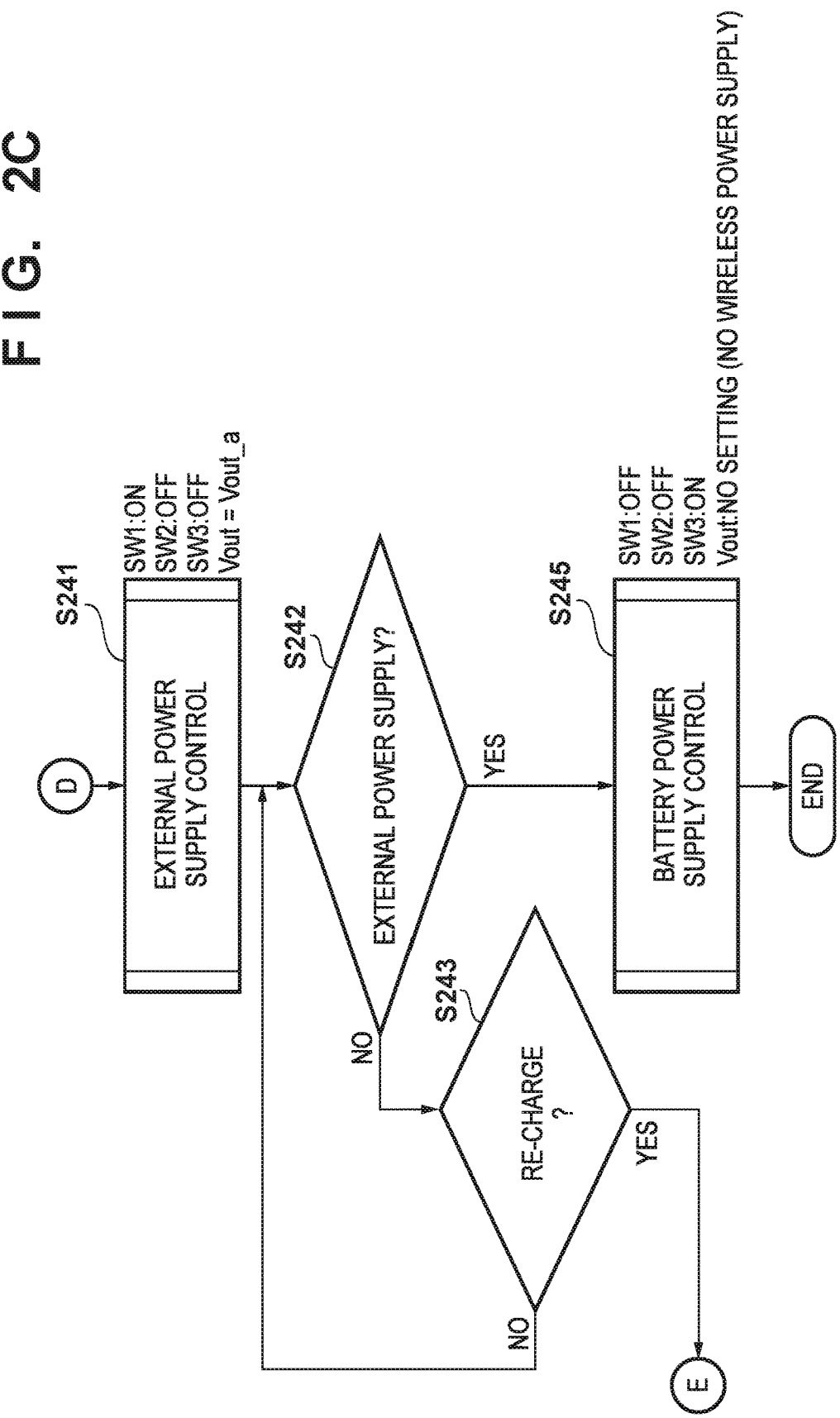

Next, a wireless power supply operation performed by the image capturing apparatus 10 according to the present embodiment will be described with reference to FIGS. 2A to 2C.

Hereinafter, a wireless power supply operation performed by the image capturing apparatus 10 according the present embodiment will be described using the block chart in FIG. 1 and the flowcharts in FIGS. 2A to 2C. Note that the flowcharts in FIGS. 2A to 2C are started in a state in which the image capturing apparatus 10 is undergoing battery power supply and has not received wireless power supply from the external power transmitting apparatus. In this case, the control unit 46 turns off the first switch SW1 for external power supply of the switch unit 44, turns off the second switch SW2 for external charging, turns on the third switch SW3 for battery power supply, and is in a state of not performing control of the output voltage Vout of the voltage conversion unit 32.

In step S201, the control unit 46 detects the electromagnetic waves from the external power transmitting apparatus (not shown) using the antenna 22 of the power receiving unit 20.

In step S203, the control unit 46 waits until preparation for receiving power from the external power transmitting apparatus is complete, and if it is determined that the preparation for receiving power is complete, the processing advances to step S205. In the preparation for receiving power, the control unit 46 performs wireless communication with the external power transmitting apparatus, and performs authentication alternatingly between the power transmitting and receiving apparatuses so as to check that the external power transmitting apparatus is an apparatus capable of transmitting and receiving power (e.g., pairing according to Bluetooth (registered trademark)). Note that as the preparation for receiving power, it is possible to calculate the efficiency of transmitting and receiving power, check the power that can be transmitted and received, set the power to be transmitted from the external power transmitting apparatus, and the like.

In step S205, the control unit 46 starts monitoring the output voltage Vout of the voltage conversion unit 32, the received power Pin detected by the received power detection unit 30, and the power consumption Pout detected by the power consumption detection unit 34. The power consumption Pout of the image capturing apparatus 10 is obtained based on the power consumed by the camera block 50, the power with which the main battery 40 is charged, and reactive power obtained due to voltage conversion loss in the voltage conversion unit 32, at the time of switching the on and off states of the switch unit 44. If the first switch SW1 for external power supply is on and the second switch SW2 for external charging is off, the sum of the power consumed by the camera block 50 and the reactive power in the voltage conversion unit 32 is used as the power consumption. Also, if the first switch SW1 for external power supply is off and the second switch SW2 for external charging is on, the sum of the power for charging the main battery 40 and the reactive power in the voltage conversion unit 32 is used as the power consumption. Also, if the first switch SW1 for external power supply is on and the second switch SW2 for external charging is on, the sum of the power consumed by the camera block 50, the power for charging the main battery 40, and the reactive power in the voltage conversion unit 32 is used as the power consumption. In other words, aside from the power supplied from the main battery 40 to the camera block 50, the sum of the power consumed through external power supply by the image apparatus 10 is used.

In step S207, the control unit 46 calculates the power that can be received from the external power transmitting apparatus. Here, a method for calculating the received power will be described. The received power is calculated by performing charging control on the main battery 40 using the received power from the external power transmitting apparatus. First, based on the battery voltage Vbatt of the main battery 40, the control unit 46 sets the output voltage Vout of the voltage conversion unit 32 and sets the charging control current of the charging control unit 38 to a current value for trickle charging, so as to be able to apply the charging voltage Vout_c needed for trickle charging control. Then, the second switch SW2 for external charging is turned on. Next, the control unit 46 transmits a transmitted power setting request to the external power transmitting apparatus via the communication unit 64 so as to be able to receive the power according to which trickle charging is possible. Here, by performing power monitoring in step S205, the control unit 46 performs received power control while communicating with the external power transmitting apparatus such that excessive power reception and insufficient power reception do not occur. Next, the control unit 46 controls the output voltage of the voltage conversion unit 32 and the charging current of the charging control unit 38 while balancing the received power and the power consumption through the power monitoring and received power control, and transitions to rapid charging (constant current charging) control. Next, the control unit 46 increases the charging current value for the main battery 40 within a range in which it is possible to receive power from the external power transmitting apparatus, and fixes the charging current value at either the upper limit of the charging current value to the battery or the upper limit of the power that can be received. Here, when the charging current value is increased, an actual measured value is used to detect how much received power can be obtained and the power transmission/reception efficiency and power that can be transmitted and received are calculated, but it is also possible to use a method in which the received power that can be obtained is estimated before one of the received power and the charging current reaches the upper limit.

In step S209, the control unit 46 compares the power consumption Pout of the image capturing apparatus 10 and the power Pin that can be received to determine whether or not it is possible to switch from battery power supply control to external power supply control. If the control unit 46 determines that external power supply is possible, the processing advances to step S211, and if the control unit 46 determines that external power supply is not possible, the processing advances to step S223. Note that the power consumption of the image capturing apparatus 10 may be obtained by detecting and calculating the current that flows in the third switch SW3 for battery power supply and the voltage Vbatt of the main battery 40. Also, the power consumption in each operation mode of the image capturing apparatus 10 may be stored in the memory 54 as a table in advance and may be read out from the table.

In step S211, the control unit 46 determines whether or not the main battery 40 can be charged with a charging current value Ic that is greater than or equal to a predetermined threshold Io, while supplying the output voltage Vout of the voltage conversion unit 32 to the power supply unit 51 of the camera block 50 at the first setting voltage Vout_c. If the control unit 46 determines that charging is possible, the processing advances to step S233, and if the control unit 46 determines that external power supply is not possible, the processing advances to step S213. The predetermined threshold Io is a current value stored in the memory 54 in advance, and may be changed according to the charge state or battery voltage of the main battery 40. Here, the power consumption of the image capturing apparatus 10 for driving the camera block 50 will be described. Since the switching loss and the conduction loss of the power supply unit 51 changes according to the input voltage, the output voltage, and the consumed current, the reactive power consumed by the voltage conversion unit 32 and the power supply unit 51 also changes according to the conditions of the input voltage, the output voltage, and the consumed current. In other words, the power consumption of the image capturing apparatus 10 for driving the camera block 50 differs according to the input voltage Vin and output voltage Vout of the voltage conversion unit 32 and the consumed current in the case of driving the camera block 50 with the output voltage Vout. Accordingly, in order to minimize the power consumption of the image capturing apparatus 10 for driving the camera block 50, the control unit 46 need only control the output voltage of the voltage conversion unit 32 according to the power receiving state (whether or not the input voltage is determined) and the camera running state (whether or not the consumed current is determined). The control unit 46 may store a table of output voltage values corresponding to the input voltage Vin to the voltage conversion unit 32 and the operation mode of the image capturing apparatus 10 in the memory 54 in advance and read out the values from the table, or may calculate the values using another method.

In step S213, the control unit 46 cannot charge the main battery 40 with a charging current greater than or equal to the predetermined threshold Io, and therefore performs external power supply control on the image capturing apparatus 10 by controlling the output voltage Vout of the voltage conversion unit 32. In external power supply control, in order to reduce the power consumption of the image capturing apparatus 10 for driving the camera block 50, the control unit 46 controls the output voltage Vout of the voltage conversion unit 32 to be a second setting voltage Vout_a according to the power reception state and the driving state of the camera block 50, and thereby external power supply is started. As shown in FIG. 3A, the second setting voltage Vout_a corresponds to a voltage value at which the power loss of the image capturing apparatus 10 is at its minimum. FIG. 3A illustrates a relationship between power loss at the time of driving a load of the image capturing apparatus 10 and the output voltage Vout. The second setting voltage Vout_a is a value that changes according to the consumed current at the time of driving the camera block 50 of the image capturing apparatus 10, and the driving power changes according to the consumed current of the image capturing apparatus 10 and the output voltage Vout.

Also, in order to prevent the power supply to the camera block 50 from being interrupted, the control unit 46 stops the control for charging the main battery 40 or sets a charging current that is less than or equal to the predetermined current value and switches from battery power supply to external power supply to change the setting of the output voltage Vout of the voltage conversion unit 32. Also, the switch unit 44 switches on the first switch SW1 for external power supply, switches off the second switch SW2 for external charging, and switches off the third switch SW3 for battery power supply. Also, the control unit 46 simultaneously performs received power control while communicating with the external power transmitting apparatus in order to prevent the occurrence of excessive received power and insufficient received power. Note that if the output voltage Vout is less than or equal to the lower limit threshold of the second setting value Vout_a, a switch is made from external power supply to a battery power supply state.

In step S215, the control unit 46 compares the received power Pin from the external power transmitting apparatus and the power consumption Pout of the image capturing apparatus 10. Here, the control unit 46 determines whether or not the received power Pin and the power consumption amount Pout are approximately equal and no difference is present, and if it is determined that a difference is present, the processing advances to step S217.

In step S217, as a result of the comparison in step S215, if the control unit 46 determines that the power consumption Pout is greater than the received power Pin, the processing advances to step S231, and if the control unit 46 determines that the power consumption Pout is less than the received power Pin, the processing advances to step S219.

In step S219, the control unit 46 sets the output voltage Vout of the voltage conversion unit 32 to the first setting voltage Vout_c and performs external power supply control and external charging control at the same time. Here, the control unit 46 changes the output voltage of the voltage conversion unit 32 from the second setting voltage Vout_a to the first setting voltage Vout_c. Also, the control unit 46 turns on the first switch SW1 for external power supply in the switch unit 44, turns on the second switch SW2 for external charging, and turns off the third switch SW3 for battery power supply.

In step S221, the control unit 46 detects the voltage Vbatt of the main battery 40 through the battery voltage detection unit 42 and determines whether or not charging is complete. If the control unit 46 determines that charging is not complete, the processing returns to step S215 and the control unit 46 repeats the processing from the comparison of the received power Pin and the power consumption Pout. Also, if the control unit 46 determines that charging is complete, the processing moves to step S241.

If the power consumption is greater than the received power in step S217, in step S231, the control unit 46 determines whether or not the operation mode of the image capturing apparatus 10 was changed. If the control unit 46 determines that there is no change in the operation mode of the image capturing apparatus 10, the processing returns to step S213, the control unit 46 stops the external charging, and changes the output voltage of the voltage conversion unit 32 from the first setting voltage Vout_c to the second setting voltage Vout_a. Here, surplus power obtained by reducing the power consumption of the image capturing apparatus 10 in step S213 is consumed as charging power to the main battery 40 in step S219, and increases and decreases in the power consumption relative to the predetermined received power are intentionally controlled so as to maintain balance. In other words, charging of the main battery 40 can be performed intermittently by repeating the cycle of accumulating power when the output voltage Vout of the voltage conversion unit 32 is the second setting voltage Vout_a and discharging the power when the output voltage Vout is the first setting voltage Vout_c. If the output voltage of the voltage conversion unit 32 is fixed at the first setting voltage Vout_c, the power consumption of the image capturing apparatus 10 cannot be reduced, and therefore no surplus power is obtained and charging of the main battery 40 cannot be performed.

Also, if the control unit 46 determines in step S231 that the operation mode of the image capturing apparatus 10 was changed, the processing returns to step S209, and the control unit 46 repeats similar processing starting from the determination of whether or not external power supply is possible.

In step S241, the control unit 46 stops external charging control and switches to external power supply control. The control unit 46 controls the switch unit 44 to switch on the first switch SW1 for external power supply, switch off the second switch SW2 for external charging, and switch off the third switch SW3 for battery power supply. Also, the control unit 46 changes the output voltage Vout of the voltage conversion unit 32 from the first setting voltage Vout_c to the second setting voltage Vout_a. Also, the control unit 46 simultaneously performs reception power control while communicating with the external power transmitting apparatus in order to prevent the occurrence of excessive received power and insufficient received power.

In step S242, the control unit 46 determines whether or not to stop external power supply control, and if it is determined that external power supply control is to be stopped, the processing advances to step S245, and if it is determined that external power supply control is not to be stopped, the processing advances to step S243.

In step S243, the control unit 46 determines whether or not to perform re-charging of the battery, and if it is determined that re-charging is to be performed, the processing returns to step S211 and the control unit 46 performs similar processing starting from the determination of whether or not external charging is possible. Also, if the control unit 46 determines that re-charging is not to be performed, the processing moves to step S242.

In step S245, the control unit 46 switches to battery power supply control and stops power reception from the external power transmitting apparatus. The control unit 46 controls the switch unit 44 to switch off the first switch SW1 for external power supply, switch off the second switch SW2 for external charging, and switch on the third switch SW3 for battery power supply.

Also, if it is determined in step S209 that external power supply is not possible, the processing advances to step S223, and the control unit 46 determines whether or not external charging is to be performed, and if it is determined that external charging is to be performed, the processing advances to step S225, and if it is determined that external charging is not to be performed, the processing moves to step S205, and similar processing is performed starting from the monitoring of the power.

In step S225, the control unit 46 sets the output voltage Vout of the voltage conversion unit 32 to the first setting voltage Vout_c. Also, the control unit 46 controls the switch unit 44 to turn off the first switch SW1 for external power supply, turn on the second switch SW2 for external charging, and turns on the third switch SW3 for battery power supply.

In step S227, the control unit 46 detects the voltage Vbatt of the main battery 40 through the battery voltage detection unit 42 and determines whether or not charging is complete. Also, if the control unit 46 determines that charging is complete, the processing advances to step S241, and if the control unit 46 determines that charging is not complete, the processing advances to step S229.

In step S229, the control unit 46 compares the received power Pin from the external power transmitting apparatus and the power consumption Pout of the image capturing apparatus 10. Here, the control unit 46 determines whether or not the received power Pin and the power consumption amount Pout are approximately equal and no difference is present, and if it is determined that no difference is present, the processing advances to step S227 and the control unit 46 determines that charging is complete. Also, if the control unit 46 determines that a difference is present, the processing returns to step S215, and the charging current is controlled by the charging control unit 38 such that the power consumption amount Pout and the received power amount Pin due to external charging become equal.

Also, if it is determined in step S211 that external charging is possible, the processing advances to step S233, and the control unit 46 performs external power supply control and external charging control at the same time with the output voltage Vout of the voltage conversion unit 32 set to the first setting voltage Vout_c. The control unit 46 controls the switch unit 44 to switch on the first switch SW1 for external power supply, switch on the second switch SW2 for external charging, and switch off the third switch SW3 for battery power supply.

In step S235, the control unit 46 detects the voltage Vbatt of the main battery 40 through the battery voltage detection unit 42 and determines whether or not charging is complete. Also, if the control unit 46 determines that charging is complete, the processing advances to step S241, and if the control unit 46 determines that charging is not complete, the processing advances to step S239.

In step S239, the control unit 46 compares the received power Pin from the external power transmitting apparatus and the power consumption Pout of the image capturing apparatus 10. Here, the control unit 46 determines whether or not the received power Pin and the power consumption amount Pout are approximately equal and no difference is present, and if it is determined that no difference is present, the processing advances to step S235 and the control unit 46 determines that charging is complete. Also, if the control unit 46 determines that a difference is present, the processing returns to step S233, and the charging current is controlled by the charging control unit 38 such that the power consumption amount Pout for external charging and the received power amount Pin become equal.

As described above, the power received from an external apparatus changes according to the positions, orientations, and surrounding environments of antennas (existence of obstructions, etc.) of the apparatuses, and there are cases where the received power is limited and cases where the received power is unstable. In such cases, the power receiving apparatus can be operated with received power, but the power for battery charging cannot be continuously ensured. In such conditions, in the present embodiment, the output voltage Vout at the time of external power supply is controlled so as to reduce the power consumption of the image capturing apparatus 10. In other words, the output voltage Vout at the time of external power supply is controlled to be the second setting voltage Vout_a, at which power loss at the time of operating the image capturing apparatus 10 is at its minimum, and the surplus power obtained thereby is used to perform charging. Also, if the power consumption Pout of the image capturing apparatus 10 is greater than the received power Pin (YES in step S217), external charging control is stopped. In this manner, even if the power amount that can be received from an external apparatus through wireless power consumption is sufficient to operate the power receiving apparatus but not sufficient to charge the battery, the power receiving apparatus can be operated stably, and the charging time of the battery can be shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-248393, filed Dec. 21, 2016 which is hereby incorporated by reference herein in its entirety.

What is claimed is:

1. An electronic apparatus comprising:
a chargeable battery;
a power receiving unit capable of receiving power from an external apparatus with non-contact;
a charging control unit configured to charge the battery with power received from the external apparatus;
a switching unit configured to switch to a state of supplying power to at least one of a power supply unit of an apparatus and the battery based on a predetermined voltage obtained using the power received from the external apparatus; and
a control unit configured to control power supply to the power supply unit of the apparatus and charging of the battery using the power received from the external apparatus,
wherein if a power amount that can be received from the external apparatus is sufficient to operate the apparatus but not sufficient to charge the battery, the control unit controls the predetermined voltage so as to reduce power consumption during operation of the apparatus, and if the received power is greater than the power consumption during operation of the apparatus, the control unit charges the battery using the power received from the external apparatus.

2. The apparatus according to claim 1, wherein
if power is to be supplied to the apparatus using the received power, the control unit controls the predetermined voltage to be a second setting voltage at which power loss during operation of the apparatus is at its minimum.

3. The apparatus according to claim 1, wherein
if power is to be supplied to the apparatus using the received power, the control unit compares the received power and the power consumption during operation of the apparatus and performs control such that the received power and the power consumption during operation of the apparatus are equal.

4. The apparatus according to claim 1, wherein
if the power consumption during operation of the apparatus exceeds the received power, the control unit stops the charging of the battery.

5. The apparatus according to claim 1, wherein
if the battery is to be charged using the received power, the control unit controls the predetermined voltage to be a first setting voltage for trickle charging.

6. The apparatus according to claim 1, wherein
after the charging of the battery performed with the received power is complete, the control unit switches to power supply to the apparatus using the received power.

7. The apparatus according to claim 2, wherein
if the second setting voltage is less than or equal to a threshold, the control unit performs control so as to switch power supply to the apparatus using the received power to power supply using the battery.

8. The apparatus according to claim 1, wherein
the switching unit includes a first switch that is switched on in a case where power supply to the apparatus is to be performed with the received power, a second switch that is switched on in a case where charging of the battery is to be performed with the received power, and a third switch that is switched on in a case where power supply to the apparatus is to be performed with the battery.

9. The apparatus according to claim 1, further comprising:
a voltage conversion unit configured to convert an input voltage corresponding to the received power into the predetermined voltage;
a received power detection unit configured to detect the received power;
a power consumption detection unit configured to detect power consumption during operation of the apparatus and during charging of the battery with the received power; and
a battery voltage detection unit configured to detect the voltage of the battery.

10. The apparatus according to claim 1, wherein
the power consumption during operation of the apparatus corresponds to a sum of power consumed by the apparatus using the received power, aside from the power supplied from the battery.

11. A control method of an electronic apparatus which has a chargeable battery,
a power receiving unit capable of receiving power from an external apparatus with non-contact,
a charging control unit configured to charge the battery with power received from the external apparatus, and
a switching unit configured to switch to a state of supplying power to at least one of a power supply unit of an apparatus and the battery based on a predetermined voltage obtained using the power received from the external apparatus, the method comprising:
controlling power supply to the power supply unit of the apparatus and charging of the battery using the power received from the external apparatus,
wherein in the controlling, if a power amount that can be received from the external apparatus is sufficient to operate the apparatus but not sufficient to charge the battery, the control unit controls the predetermined voltage so as to reduce power consumption during operation of the apparatus, and if the received power is greater than the power consumption when operating the apparatus, the control unit charges the battery using the power received from the external apparatus.

12. A computer-readable storage medium storing a program for causing a computer to execute a control method of an electronic apparatus which has a chargeable battery,
a power receiving unit capable of receiving power from an external apparatus with non-contact,
a charging control unit configured to charge the battery with power received from the external apparatus, and
a switching unit configured to switch to a state of supplying power to at least one of a power supply unit of an apparatus and the battery based on a predetermined voltage obtained using the power received from the external apparatus, the method comprising:
controlling power supply to the power supply unit of the apparatus and charging of the battery using the power received from the external apparatus,
wherein in the controlling, if a power amount that can be received from the external apparatus is sufficient to operate the apparatus but not sufficient to charge the battery, the control unit controls the predetermined voltage so as to reduce power consumption during operation of the apparatus, and if the received power is greater than the power consumption when operating the apparatus, the control unit charges the battery using the power received from the external apparatus.

* * * * *